United States Patent Office 3,352,822
Patented Nov. 14, 1967

3,352,822
POLYURETHANE ELASTOMERS STABILIZED WITH PHENYLTHIOUREAS AND ACID ANHYDRIDES
Reizo Yamadera and Hiroshi Ono, Shiga-gun, Shiga-ken, and Toshimi Matsui, Tsuruga, Japan, assignors to Toyo Spinning Co., Ltd., Kita-ku, Osaka, Japan
No Drawing. Filed Feb. 23, 1965, Ser. No. 434,646
Claims priority, application Japan, Feb. 26, 1964, 39/10,551
11 Claims. (Cl. 260—45.85)

This invention relates to a method for stabilizing polyurethane elastomers and, more particularly, to a method for preventing polyurethane elastomers from discoloring on contact with combustion gas or ultraviolet light, as well as to the stabilized polyurethane elastomer materials themselves.

Generally, elastomers based on isocyanates, that is to say, polyurethane elastomers have the disadvantage of yellowing or being burnt (or browning) upon exposure to ultraviolet light, hydrocarbon and other combustion gas, or nitrogen oxide gas.

For the purpose of improving the resistance to weathering of polyurethane elastomers containing amino groups, imino groups, urea linkage, acid-amide linkage and urethane linkage, for instance, in the molecular structure, it is conventional to add antioxidant, ultraviolet absorbent or combustion gas discoloration inhibitors, etc. Ordinarily, the ultraviolet absorbent is used along with the antioxidant and other stabilizers.

However, none of the many polyurethane elastomer stabilizers so far known afford fully satisfactory protection against ultraviolet light or gas discoloration, and many of them have failed to prevent discoloration of polyurethane elastomers completely in long time exposure to light or combustion gas of hydrocarbon fuels. Some of them rather detract from the desirable properties of polyurethane elastomers. Moreover, since the stabilizing efficiency of such gas discoloration inhibiting or other stabilizing agent depends on the compatibility or affinity between the particular agent and the particular polymer to be stabilized, reactivity of the agent within the polymer, and other factors, particular polymer.

Accordingly, it is an object of this invention to provide a means for stabilizing polyurethane elastomers and shaped articles thereof against discoloration upon exposure to light or fumes.

Other objects of the invention will be apparent from the following description.

We have found that the yellowing or burning (browning) of polyurethane elastomers by the action of light or combustion gas is substantially prevented by adding at least one compound selected from phenylthiourea compounds and organic carboxylic anhydrides to the polyurethane elastomers.

The term "polyurethane elastomers" as used throughout this specification and the claims appended thereto means any and all elastomers containing urethane linkage, urea linkage, acid amide linkage, etc. For example, they may be produced by reacting a polyglycol having terminal hydroxyl radicals with an excess of organic diisocyanate to prepare a prepolymer having terminal isocyanate radicals and, then, extending the polymer chain with a bifunctional compound having active hydrogens.

Since methods of producing these linear polyurethane elastomers in the above procedure are well known in the art and do not constitute a part of the present invention, no further detailed explanation thereabout would be necessary except the following description which explains some preferable methods of producing polyurethane elastomers to which the present invention may be conveniently applied.

It is preferable to produce polyurethane elastomers by reacting an excess of an organic diisocyanate with a polyglycol to prepare a prepolymer having terminal isocyanate radicals, dissolving the prepolymer so prepared in a polar solvent, finally, reacting the prepolymer in the solution so prepared with a bifunctional active hydrogen-containing compound to proceed the polymer chain extension or polymerization. At the end of the polymerization or chain extending reaction, it is sometimes preferable to stop the chain with a suitable chain stopper. Furthermore, in order to stabilize the viscosity of the resulting polymer solution, it is preferable to neutralize the excess of any remaining amine (used as the chain extender or chain stopper) with acid, which may typically be acetic acid.

Examples of preferred organic diisocyanates to be used in the production of polyurethane elastomers are those having aromatic rings, e.g. methylene-bis-(4-phenyl isocyanate), 2,4-tolylene diisocyanate, 2,6-tolylene diisocyanate, m-phenylene diisocyanate, etc. More preferable are those diisocyanates wherein the two isocyanate radicals are equal in reactivity and are fairly high in reactivity. Examples of these diisocyanates are p-phenylene diisocyanate, m-phenylene diisocyanate, 4,4'-biphenylene diisocyanate, methylene-bis-(4-phenyl diisocyanate), xylene diisocyanate, etc.

Polyglycols to be used in the production of polyurethane elastomers preferably have a molecular weight of about 500 to 6000 and a melting point not higher than 60° C., and are selected from the group consisting of dihydroxy polyethers, dihydroxy, polyesters, dihydroxy polyhydrocarbons, etc. which may be known per se.

Examples of polar solvents in which the prepolymer is dissolved and in which the chain extending reaction is conducted are N,N-dimethylformamide, N,N-dimethylacetamide, tetrahydrofuran, dimethylsulfoxide or a mixture of any two or more of them.

The chain extender of bifunctional active hydrogen-containing compound which is used for extending the polymer chain may be selected from the group consisting of diols, diamines and hydrazine.

The chain stopper may be selected from the group consisting, for example, of monoamines, hydroxyamines, monohydric alcohols, etc.

The polymer solution prepared as above may be shaped into various articles such as fiber or film, or it may be used in various coating applications.

The important feature of this invention is to incorporate in or apply to these polyurethane elastomers or their shaped articles a compound selected from the group consisting of phenylthioureas and organic carboxylic anhydrides.

The elastomers to which the said compound is added or applied may be in any form. For example, it may be added to the elastomer itself or a solution thereof or a dispersion thereof in a suitable dispersion media. Alternatively the compound may be applied to the fiber, film, or elastomeric product made therefrom or the articles coated with the polymer.

The phenylthioureas which are to be employed according to this invention are those compounds which may be represented by the following general formula:

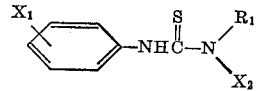
(I)

wherein $X_1$ is a member selected from the group consisting of hydrogen atom, halogen atoms, alkyl, aryl and aralkyl radicals, $X_2$ is a member selected from the group consisting of hydrogen atom, alkyl, aryl and aralkyl radicals, and where $X_1$ and $X_2$ has a benzene ring, the said ring may be substituted with a halogen or an alkyl radical having 4 or less carbon atoms; $R_1$ is hydrogen or an alkyl radical containing 4 or less carbon atoms.

Thus, $X_1$ is exemplified by hydrogen, methyl, ethyl, propyl, tertiary butyl, benzyl, phenyl, chlorine, bromine, iodine, etc. Among those represented by $X_2$ are, for example, hydrogen, methyl, ethyl, propyl, normal butyl, pentyl, phenyl, chlorophenyl, dichlorophenyl, biphenyl, benzyl, phenethyl, etc., and $R_1$ is exemplified by hydrogen, methyl, ethyl, propyl, and n-butyl.

Typical examples of the compound having the above general Formula I include phenylthiourea, 4-methylphenylthiourea, phenylmethylthiourea, phenylethyl thiourea, phenyldiethylthiourea, diphenylthiourea, phenylbenzylthiourea, di-(4-methylphenyl)thiourea, N-phenyl-N'-methyl-N'-phenylthiourea, 4-chlorophenyl - phenylthiourea, 2-chlorophenyl-phenylthiourea, di-(4-chlorophenyl)-thiourea, di-(4-bromophenyl)-thiourea, 4 - bromophenyl-phenylthiourea, N-phenyl-N'-(4-ethylbenzoate)-thiourea, and the like.

The acid anhydride to be employed in this invention is preferably selected from the class consisting of anhydrides of aliphatic monocarboxylic acids, e.g. anhydrides such as acetic anhydride, propionic anhydride, butyric anhydride, valeric anhydride, caproic anhydride, etc., and aliphatic dicarboxylic anhydrides such as succinic anhydride, malonic anhydride, maleic anhydride, etc., although aromatic carboxylic anhydrides such as phthalic anhydride, benzoic anhydride, etc. may likewise be employed. Particularly preferred are the anhydrides of those organic carboxylic acids, the dissociation constants of which are in the order from $10^{-4}$ to $10^{-5}$ (25° C.). The anhydrides of the acids which have too large dissociation constants, e.g. organic carboxylic acid having halogen substituents in the main chains, are too reactive and, accordingly, adversely affect the elastomer. Therefore, whenever such an anhydride is used, it is necessary to control the amount of addition or, when it is used in the after-treatment of shaped articles, to select mild conditions.

One of the preferred embodiments of this invention is to add the above-mentioned phenylthiourea or/and acid anhydride to a solution of the polymer.

If too much of the acid anhydride is used, an excess of the acid anhydride would remain in the polymer system. The excess anhydride will cause degradation of the polymer due to acid hydrolysis when the polymer system contains or contacts water or other impurities. Therefore, the amount of the acid anhydride to be added or applied to the elastomer must be subject to utmost scrutiny. Moreover, while the tendency of the fiber and other shaped articles of polyurethane elastomer to yellow is substantially alleviated when they are after-treated with the acid anhydride, the articles may suffer somewhat in strength and other properties. This is presumably because, since it is relatively difficult to remove the excess of the acid anhydride adsorbed on the articles, the molecules forming the articles are hydrolyzed by the acid.

In another embodiment of this invention the phenylthiourea and/or acid anhydride are applied to the fiber, film or other shaped article after they have been formed, e.g. at the time of oil treatment in the spinning process or in the course of after-treatment. However, in view of the possible removal of the said compounds upon repeated laundering, for instance, it is preferable to incorporate them in the polymer itself.

In order to obtain a satisfactory result, it is preferable to incorporate or apply the phenylthiourea to the elastomer in an amount of about 0.1–5%, preferably 0.5–3% by weight based upon the elastomer. It is preferable to add the phenylthiourea to the polymer after the reaction which leads to the formation of the polyurethane elastomer has gone to completion.

The amount of said acid anhydride ranges to be added or applied to the elastomer from about 0.01 to about 10% and, more preferably, from 0.03% to 2% by weight based on the polyurethane elastomer, and from about 3 to 20 mole percent and, preferably, 8 to 12 mole percent relative to the organic diisocyanate used in the preparation of the prepolymer. The addition of the acid anhydride is preferably after the polymerization reaction has gone to completion and, preferably, after the polymerization is stopped, although it may also be after the addition of acid for neutralization. It is also possible to add the acid anhydride without adding the acid for the neutralization.

It is advisable to employ both the phenylthiourea and acid anhydride at the same time. In this case, sufficient effects can be obtained even when their amounts are less than the sum of the optimum amounts of both used singly.

By the incorporation or application of the phenylthiourea and/or acid anhydride to the polyurethane elastomer according to this invention the elastomer or its articles is stabilized against development of color by the action of light and fumes or combustion gas.

To test the tendency of the polyurethane elastomer to be discolored upon contact with combustion gas, a gas burner is placed in a container which has a capacity of 0.5 m.$^3$ and the top wall of which is provided with a circular vent hole measuring 8 cm. in diameter, and the temperature within the container is held at 60 °C. by allowing the burner to effect complete combustion of 800 cc. of propane gas per minute. The concentration of the $NO_2$ gas within the container is $0.74 \times 10^{-6}$ g./l. The specimen to be tested is suspended within the containers so that it remains exposed to the combustion gas or fume for 5 hours, at the end of which time the specimen is taken out and graded. Grade 1 corresponds with the polyurethane elastomer containing no stabilizer, which has been severely discolored by the gas. Grade 5 is equivalent to the color of the polyurethane elastomer which has not been exposed to the gas. Between the two grades, there are three grades to classify the degree of discoloration.

To ascertain the light resistance of the polyurethane elastomer, a Fade-O-Meter is used. The specimen placed at a distance of 25 centimeters from a light source (140 volts, 17 amperes) is illuminated at an ambient temperature of 40° C. Based on the results obtained, tthe specimen is graded. Grade 1 corresponds with the polyurethane elastomer containing no stabilizer, which has been severely discolored. Grade 5 is equivalent to the color of the polyurethane elastomer which has not been exposed to light. Between the two extremes, there are three grades.

When the phenylthiourea is added or applied according to this invention, the tendency of the elastomer to be discolored is considerably reduced so that its resistance to gas discoloration is equivalent to Grade 3 or higher. In some cases, the value corresponds with Grade 4 or 5. Thus, the use of phenylthiourea is of great practical value.

Where acid anhydride is used according to the invention, there are observed improvements in the resistance of the polyurethane elastomer to both light and gas discolorations and the results of the above-mentioned two tests correspond with Grade 3 or better.

To fully exploit these favorable effects, it is particularly desirable to add or apply both phenylthiourea and acid anhydride to polyurethane elastomers.

This invention will be further described in detail by way of the following examples, in which all parts are by weight unless otherwise specified.

*Example 1*

Forty parts of polytetramethylene ether glycol (molecular weight: 1000) and 20 parts of methylene bis-(4-phenylisocyanate) were heated together at 85° C. for 1 hour with constant stirring to prepare a prepolymer having terminal isocyanate radicals, which was dissolved in 100 parts of N,N-dimethylformamide. The solution was cooled to 0° C. and, then, a solution of 2 parts of hydrazine hydrate in 50 parts of N,N-dimethylformamide was gradually added. The reaction mixture was stirred for 15 minutes while cooling with water, and then the polymerization reaction was stopped by adding 3 parts of 10% solution of monoethanol amine in N,N-dimethyl formamide. To 10 parts of the polyurethane elastomer solution prepared as above was added 0.03 part of diphenylthiourea and the mixture was thoroughly stirred. The mixture was then adjusted to room temperature and extruded through a spinnerette having 10 holes into a dry-spinning column held at 180° C. The filaments were taken up just below the spinning column.

When the polyurethane elastic yarn prepared as above was exposed to combustion gas in the described manner, it was found to correspond to Grade 4. The resistance to combustion gas of a similar polyurethane elastic yarn which had been prepared in the same manner as above but containing no diphenylthiourea was found to correspond to Grade 1.

*Example 2*

The polyurethane elastic yarn prepared by dry-spinning the same polymer as Example 1 but containing no diphenylthiourea was immersed in 2% methanolic solution of diphenylthiourea for 20 seconds and then dried. When this elastic yarn was exposed to combustion gas in the same manner as described hereinbefore, it was found to correspond to Grades 3–4.

*Example 3*

Forty parts of polytetramethylene-ether-glycol (average molecular weight: 1000) was reacted with 20 parts of methylene-bis-(4-phenyl-isocyanate) at 80° C. for 1 hour with constant stirring to prepare a prepolymer having terminal isocyanate radicals, which was dissolved in 100 parts of N,N-dimethylformamide. The reaction mixture was stirred for 15 minutes while cooling with water, and then a solution of 1.8 parts of hydrazine hydrate in 50 parts of N,N-dimethylformamide was gradually added. The viscosity of the resulting solution was 2800 poises at 20° C. The polymerization reaction was stopped by adding 3 parts of 10% solution of monoethanol amine in N,N-dimethylformamide to the above reaction mixture. The resulting solution was divided into several portions, one of which was made a control. 0.03 part of phenylthiourea, phenylbenzylthiourea, N-phenyl-N'-methyl-N'-phenylthiourea, p-chlorophenyl-phenylthiourea, and N-phenyl-N'-(p-ethylbenzoate)-thiourea were added to the above portions respectively. Each of the resulting solutions was extruded through a spinnerette having 14 holes into a dry-spinning column held at 220° C. and the resulting filaments were taken up at the rate of 200 m./min.

The polyurethane elastic yarns prepared as above were exposed to combustion gas in the described manner. The results are summarized in the following table.

Degree of discoloration, Grade
Control (no addition) _____ 1
Phenylthiourea _____ 3
Phenylbenzylthiourea _____ 4–5
N-phenyl-N'-methyl-N'-phenylthiourea _____ 3
P-chlorophenyl-phenylthiourea _____ 4–5
N-phenyl-N'-(p-ethylbenzoate)thiourea _____ 4

*Example 4*

The control polyurethane elastic yarns prepared in Example 3 (containing no stabilizer) were immersed in 1% methanolic solutions of phenylthiourea, phenylbenzylthiourea, N-phenyl-N'-methyl-N'-phenylthiourea, p-chlorophenyl-phenylthiourea, and N-phenyl-N'-(p-ethylbenzoate)thiourea, respectively. Each of the elastic yarns was squeezed until the remaining content of the methanolic solution on the yarn was 100% of the weight of the yarn, followed by drying. Then, the samples were exposed to combustion gas in the described manner. The results are as follows.

Degree of discoloration, Grade
Control (no stabilizer) _____ 1
Phenylthiourea _____ 4
Phenylbenzylthiourea _____ 4–5
N-phenyl-N'-phenylthiourea _____ 4
P-chlorophenyl-phenylthiourea _____ 4–5
N-phenyl-N'-(p-ethylbenzoate)thiourea _____ 4

*Example 5*

To 100 parts of the control spinning solution prepared in the same manner as Example 3 were added 0.3 part of 2-(2-hydroxy-5-methylphenyl)benzotriazole (ultraviolet absorbent) and 0.3 part of 4,4'-butylidene-bis-(6-t-butyl-m-cresol (antioxidant) and the mixture was thoroughly stirred to prepare a solution. To each 10 parts of this solution was added 0.05 part of phenyldiethylthiourea, O-chlorophenyl-phenylthiourea, di-(p-chlorophenyl)thiourea, and di-p-tolylthiourea, respectively. Each spinning solution prepared as above was dry-spun in the same manner as Example 3 and the resulting elastic yarns were exposed to combustion gas in the described manner. The same yarns were also exposed to ultraviolet light for 40 hours by means of Fade-O-Meter.

|  | Combustion gas (grade) | Fade-O-Meter 40 hr. (grade) |
| --- | --- | --- |
| (1) Phenyldiethlthiourea | 3 | 3 |
| (2) O-chlorophenyl-phenyl-thiourea | 4 | 4 |
| (3) Di-(p-chlorophenyl)-thiourea | 4 | 4 |
| (4) Di-p-tolylthiourea | 3 | 3 |

*Example 6*

To each 10 parts of the spinning solutions of Example 5 was further added 0.05 part of acetic anhydride and the resulting mixture was spun into a polyurethane elastic yarn in the same manner as the preceding example. The yarns were exposed to ultraviolet light for 40 hours by means of a Fade-O-Meter.

Fade-O-Meter 40 hr., Grade
Phenyldiethylthiourea _____ 4
O-chlorophenyl-phenylthiourea _____ 4–5
Di-(p-chlorophenyl)thiourea _____ 4–5
Di-p-tolylthiourea _____ 4

*Example 7*

To 40 parts of polypropylene oxide glycol (average molecular weight: 1000) was added 7 parts of 2,4-tolylene diisocyanate and the mixture was stirred at 90° C. for 90 minutes. Then, 10 parts of methylene-bis-(4-phenyl-isocyanate) were further added, and the mixture was subjected to reaction at 80° C. for 30 minutes to prepare a prepolymer, which was dissolved in 100 parts of N,N-dimethylformamide. After the solution was cooled to 10° C., 50 parts of N,N-dimethylformamide solution containing 1.2 parts of 1,2-propylene diamine was gradually added. After the addition was completed, the mixture was stirred at 30° C. for 15 minutes, at the end of which time 3 parts of 10% solution of dibutyl amine in N,N-dimethylformamide was added. The polymer solution prepared as above had a viscosity of 800 poises. This solution was made a control. To 10-part portions of this solution were added 0.05 part of phenyldiethylthiourea, phenylbenzylthiourea, diphenylthiourea, d-(p-chlorophenyl)thiourea, and di-p-tolylthiourea, respectively, and each mixture was thoroughly stirred. Each of the spinning solutions prepared as above was extruded through a spinnerette having 30 holes into tepid water of 80° C. and the resulting filaments were taken up at the rate of 50 m./min.

The polyurethane elastic yarns prepared in the above manner were exposed to combustion gas. The results are as follows.

Degree of gas discoloration, Grade

Phenyldiethylthiourea _____ 4
Phenylbenzylthiourea _____ 4
Diphenylthiourea _____ 4
Di-(p-chlorophenyl)thiourea _____ 4–5
Di-p-tolylthiourea _____ 4–5

Example 8

Five moles of diethyl adipate, 10 moles of ethylene glycol, and 0.01 mole of zinc acetate were mixed together and an ester exchange was conducted at 170° C. After the ethanol was distilled out, the temperature was increased to 240° C. and heating was continued under reduced pressure until a predetermined amount of ethylene glycol was distilled out (about 5 hours) whereupon polyester glycol having an acid value of 0.4 and a hydroxy value of 77 was obtained. 290 parts of this polyester glycol were reacted with 100 parts of diphenylmethane 4,4'-diisocyanate at 90° C. for 40 minutes to prepare a prepolymer. 60 parts of the prepolymer obtained as above was dissolved in 150 parts of N,N-dimethylformamide, and the solution cooled to 0° C. Then, a solution of 3 parts of 1,2-propylene diamine in 50 parts of N,N-dimethylformamide was gradually added with continued stirring until the viscosity of the solution reached 1200 poises. At this time, dibutylamide and, then, 0.6 part of acetic anhydride were added, followed, further, by the addition of 0.7 part of diphenylthiourea with stirring. The polymer prepared as above was dry-spun in the same manner as Example 1.

When the resistance of the resulting polyurethane elastic yarn to combustion gas was measured as above, it was found to correspond to Grades 4–5.

A similar polyurethane elastic yarn prepared in the same manner as above except that no diphenylthiourea had been added was found to be equivalent to Grade 3 in the same test.

Example 9

To a prepolymer prepared from 500 parts of methylene-bis-(4-phenylisocyanate) and 1150 parts of polyoxytetramethylene-ether glycol (average molecular weight: 1150) were added 10 parts of 4,4'-butylidene-bis(6-t-butyl-m-cresol), 8 parts of 2-(2-hydroxy-5-methylphenyl)benzotriazole and 60 parts of zinc sulfide (average grain diameter: 0.3μ). Then the prepolymer was dissolved in dimethylformamide and subjected to chain-extension by the addition of 67 parts of 1,2-propylene diamine. When the viscosity of the solution reached 1500 poises, the above reaction was stopped by the addition of 6 parts of monomethanolamine, followed by the addition of 3 parts of acetic acid to neutralize the excess amine. Then 10 parts of acetic anhydride were added to the above solution, which was thoroughly stirred. The polymer solution prepared as above was heated to 100° C. and extruded through a spinnerette having 30 holes (each 0.2 mm. in diameter) in a dry-spinning column. The filaments taken out from the column were passed over a moving roll partially submerged in a soap slurry and taken up at the rate of 290 m./min. The soap slurry used above was an aqueous dispersion prepared by dispersing calcium stearate in an oily preparation composed mainly of mineral oil and non-ionic surfactant, the concentration of calcium stearate being about 30–60 g./l. The filaments prepared above were treated with water vapor at 100° C. for 30 minutes, followed by drying at 80° C. for 3 hours. The resistance of the resulting elastic yarn to weathering was as follows. The sample was irradiated with ultraviolet light by a Fade-O-Meter and the changes in strength and degrees of discoloration of the samples were measured. As a control, the table also shows the results for a similar elastic yarn prepared from a solution which was the same as above but containing no acetic anhydride.

| | Acetic anhydride added | | No acetic anhydride | |
|---|---|---|---|---|
| | Strength, g./d. | Whiteness (grade) | Strength, g./d. | Whiteness (grade) |
| Not irradiated | 0.89 | 5 | 0.85 | 5 |
| Fade-O-Meter, 60 hours | 0.89 | 4 | 0.80 | 3 |
| After gas discoloration test | | 3 | | 2 |

Example 10

A polyurethane solution was prepared in the same manner as Example 9, except that acetic anhydride was replaced with 20 parts of propionic anhydride, 20 parts of butyric anhydride, and 25 parts of benzoic anhydride, respectively. Each polymer solution was spun into elastic yarn in the same manner as in the preceding example. These elastic yarns were exposed to combustion gas in the described manner. The results are summarized below.

Grade

Propionic anhydride _____ 3
Butyric anhydride _____ 3
Benzoic anhydride _____ 3

Example 11

To 10 parts of methylene-bis-(4-phenyl-isocyanate) was added 0.45 part of 4,4'-butylidene-bis-(6-t-butyl-m-cresol), followed by the addition of 23 parts of polytetramethylene ether glycol (average molecular weight: 1000). The mixture was allowed to react to obtain a prepolymer. Then, 0.9 part of zinc sulfide (average grain diameter: 0.3μ) and 0.3 part of chlorine-substituted 2-(2-oxy-5-hexylphenyl)-benzotriazole were added. While stirring the mixture vigorously, 1,2-propylene diamine and, then, 0.35 part of acetic anhydride were added. The concentration of the polymer was 25%. This solution was extruded through a spinnerette having 30 holes (each 0.1 mm. in diameter) into an ethylene glycol bath at 85° C. and the filaments were taken up at the rate of 30 m./min. The resulting filaments were held under 50% tension and treated with boiling water at 100° C. for 30 minutes, followed by drying. The elastic yarn prepared as above was irradiated with ultraviolet light to determine its weather resistance. As a control, a similar elastic yarn which had been prepared in the same manner as above except that acetic anhydride had been replaced with 0.35 part of acetic acid was also tested. The results are summarized below.

| | Acetic anhydride added | | No acetic anhydride | |
|---|---|---|---|---|
| | Strength, g./d. | Whiteness (grade) | Strength, g./d. | Whiteness (grade) |
| Not irradiated | 0.65 | 5 | 0.67 | 5 |
| Fade-O-Meter, 60 hours | 0.64 | 4 | 0.85 | 3 |
| After gas discoloration test | | 3 | | 2 |

It will be apparent from the above table that the elastic yarn containing acetic anhydride is superior to the yarn containing acetic acid in weather resistance.

Example 12

To a prepolymer prepared from 750 parts of methylene-bis-(4-phenylisocyanate) and 2300 parts of polytetramethylene-ether glycol (average molecular weight: 1150) were added 30 parts of 4,4'-isopropylidene-bis-(6-t-butyl-m-cresol), 25 parts of 2(2-oxy-5-methylphenyl)-benzotriazole, and 60 parts of zinc sulfide (average grain diameter: 0.3μ). Then, the prepolymer was dissolved in dimethylformamide and was subjected to chain extension by adding 67 parts of 1,2-propylene diamine. When the viscosity of the solution reached 1000 poises, the reaction was stopped by adding 10 parts of monoethanolamine, followed by the addition of 3 parts of acetic acid to neutralize the excess amine. Then, the solution was heated and dry-spun in an atmosphere of 250° C. The filaments were immersed in an acetic anhydride bath at 700° C. for about 30 seconds, washed with water, and dried at 80° C. for 60 minutes. The resistance of the elastic yarn prepared as above to ultraviolet light was as follows. The table also shows the results for a similar elastic yarn which had been prepared in the same manner as above but had not been treated with acetic anhydride.

|  | Elastic yarn of this invention |  | No acetic anhydride |  |
|---|---|---|---|---|
|  | Strength, g./d. | Whiteness (grade) | Strength, g./d. | Whiteness (grade) |
| Not irradiated | 0.69 | 5 | 0.70 | 5 |
| Fade-O-Meter | 0.57 | 4 | 0.58 | 3 |

It will be apparent from the above table that the elastic yarn treated with acetic anhydride according to this invention is more resistant to ultraviolet discoloration. Since the treatment of the filament with 100% acetic anhydride is rather severe, it was suspected that the filament might be damaged and its strength affected, but as it turned out, no appreciable difference was observed between the filament and a similar filament which was not treated with acetic anhydride.

What we claim is:

1. A composition which comprises (a) linear polyurethane elastomer subject to discoloration by combustion gases or ultra-violet light and (b) a stabilizing amount of at least one compound selected from the group consisting of (1) a phenylthiourea of the formula

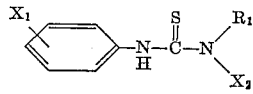

wherein
  $X_1$ represents a member selected from the group consisting of hydrogen, halogen, alkyl, aryl and aralkyl,
  $X_2$ represents a member selected from the group consisting of hydrogen, alkyl, aryl and aralkyl, and
  $R_1$ represents hydrogen and alkyl of 1 to 4 carbon atoms, and
(2) an aliphatic monocarboxylic acid anhydride.

2. A composition as in claim 1 wherein a mixture of a phenylthiourea compound and an aliphatic monocarboxylic acid anhydride is employed.

3. A composition as in claim 1 wherein a mixture of phenyldiethylthiourea and acetic anhydride is employed.

4. A composition as in claim 1 wherein the amount of the phenylthiourea ranges from 0.1 to 5% by weight based upon the linear polyurethane elastomer.

5. A composition as in claim 1 wherein the amount of the phenylthiourea ranges from 0.5 to 3% by weight based upon the linear polyurethane elastomer.

6. A composition as in claim 1 wherein the anhydride is the anhydride of an aliphatic monocarboxylic acid containing from 1 to 9 carbon atoms in the aliphatic chain.

7. A composition as in claim 6, wherein the acid anhydride is acetic anhydride.

8. A composition as in claim 1 wherein the amount of the acid anhydride ranges from 0.01 to 10% by weight based upon the linear polyurethane elastomer.

9. A composition as in claim 8 wherein the amount of the acid anhydride ranges from 0.03 to 2% by weight based upon the linear polyurethane elastomer.

10. A shaped article formed from a composition as defined in claim 1.

11. A shaped article which comprises a linear polyurethane elastomer subject to discoloration by combustion gases or ultra-violet light said article coated on the surface thereof with a stabilizing amount of at least one compound selected from the group consisting of (1) a phenylthiourea of the formula

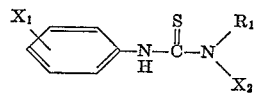

wherein
  X represents a member selected from the group consisting of hydrogen, alkyl, aryl and aralkyl,
  X represents a member selected from the group consisting of hydrogen, alkyl, aryl and aralkyl, and
  R represents hydrogen and alkyl of 1 to 4 carbon atoms, and
(2) an aliphatic monocarboxylic acid anhydride.

References Cited

UNITED STATES PATENTS 3,124,543  3/1964  Fowler et al. _____ 260—2.5
3,179,625  4/1965  Ehrhart _____ 260—75

DONALD E. CZAJA, *Primary Examiner.*

LEON J. BERCOVITZ, *Examiner.*

V. P. HOKE, R. WHITE, *Assistant Examiners.*